United States Patent [19]
Hafer

[11] Patent Number: 4,821,449
[45] Date of Patent: Apr. 18, 1989

[54] SINKER DROP

[76] Inventor: Harry Hafer, 3313 Onyx Rd., Miramar, Fla. 33025

[21] Appl. No.: 158,831

[22] Filed: Feb. 22, 1988

[51] Int. Cl.⁴ ............................................. A01K 83/00
[52] U.S. Cl. .................................... 43/41.2; 43/43.12; 43/44.97; 43/44.81
[58] Field of Search ................. 43/43.12, 44.97, 41.2, 43/42.04, 44.88, 44.81, 42.74, 43.1

[56] References Cited

U.S. PATENT DOCUMENTS

| | | | |
|---|---|---|---|
| 2,308,238 | 1/1943 | Baker | 43/43.12 |
| 2,359,588 | 10/1944 | Shea | 43/43.12 |
| 2,554,318 | 5/1951 | Wardrip | 43/41.2 |
| 3,208,182 | 8/1965 | Holthaus | 43/41.2 |
| 3,307,288 | 3/1967 | Spina | 43/42.74 |
| 3,346,986 | 8/1967 | Tükkainen | 43/43.12 |
| 3,710,501 | 1/1973 | Ware, Jr. | 43/44.88 |
| 3,854,235 | 12/1974 | Thompson | 43/43.12 |
| 4,023,300 | 5/1977 | Vieths | 43/41.2 |

Primary Examiner—Nicholas P. Godici
Assistant Examiner—Karen Skillman
Attorney, Agent, or Firm—Richard S. Ross

[57] ABSTRACT

A novel sinker drop for use in a fishing rig comprising, in combination, non-releasable means for holding one end of a sling, releasable means for holding the opposite end of the sling, means for releasing the opposite end of the sling, and initiating means for actuating the releasing means, the initiating means being responsive to contact with water where the rig is cast. The sling may be a relatively triangular net wherein one apex of the sling is attached to the non-releasable holding means and the other two apices are joined together and attached to the releasable holding means.

11 Claims, 2 Drawing Sheets

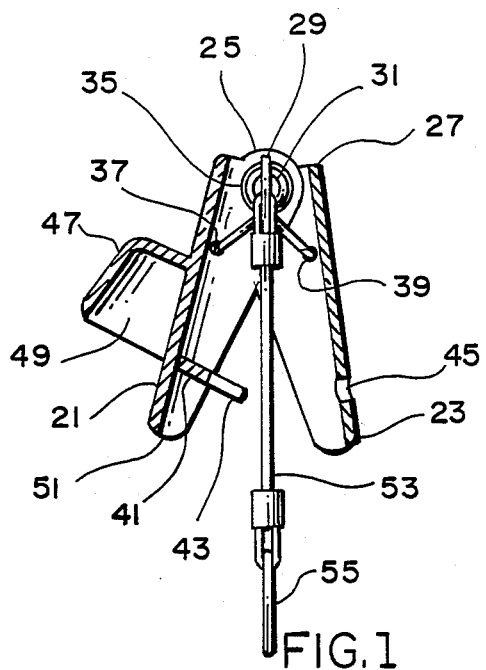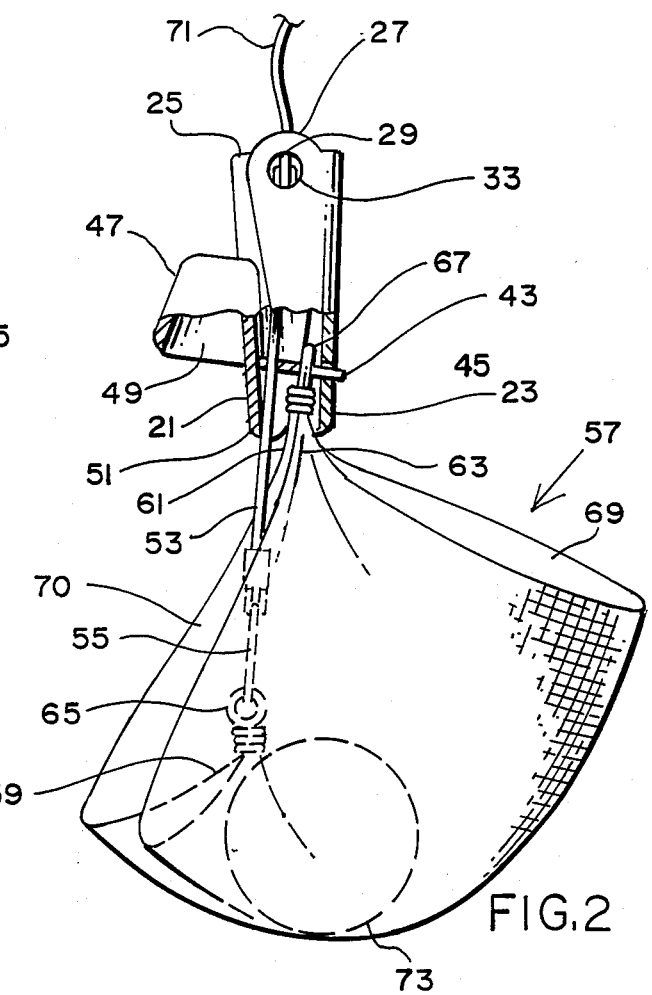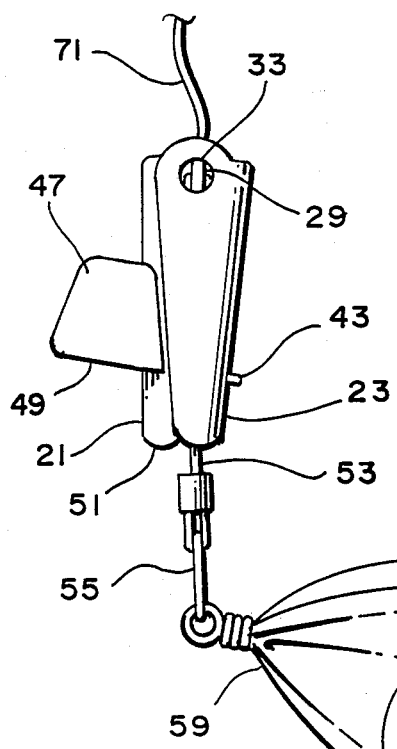
FIG. 1
FIG. 2
FIG. 3

SINKER DROP

BACKGROUND OF THE INVENTION

1. Field of the Invention

This invention relates to a novel sinker drop that is used in the rig of a fishing tackle, and particularly to a novel device that can drop an expendable weight when the device strikes the water's surface, or soon thereafter, during casting.

2. Description of the Prior Art

In many forms of recreational fishing, such as surf fishing, the fishing line is rigged to include one or more hooks and one or more sinkers. Sinkers are weights that are fixedly, slidably and/or releasably attached near the end of the line for various purposes as described, for example, by Vlad Evanoff in *Fishing Rigs For Fresh And Salt Water*, Harper & Row Publishers, Inc., New York, N.Y. 1977.

The weight of the sinker aids in casting the line. In order to gain additional casting distance, additional weight is required to carry the line and fishing rig farther out However, the additional weight may interfere with attracting fish, as by holding the hooks to close to the bottom. Additionally, if live bait is used, the weight of the sinker carries the live bait to the bottom where, for example in salt water fishing, sea scavengers such as crabs attack the bait and render it useless for attracting fish. To overcome this problem, the additional weight must be released from the rig at the end of the cast. Typically, the additional weight is a rock or a discarded spark plug, or other expendable weight carried in a sinker drop In one form, a sinker drop includes a means for releasing the additional weight when a fish strikes. One problem with this type of sinker drop is that it does not release the additional weight upon impact with the water. Also, this type of sinker drop is not adapted to carry and dump a wide variety of shapes, sizes and weights of discarded objects from other unrelated uses.

OBJECTS OF THE INVENTION

An object of this invention is to provide a novel sinker drop for use in a fishing rig.

Another object is to provide a novel sinker drop which reliably releases the additional weight therein or after the fishing rig impacts with water.

A further object is to provide a novel sinker drop which can reliably carry and dump additional weight in a wide variety of shapes, sizes and weights of objects discarded from other unrelated uses.

SUMMARY OF THE INVENTION

The novel sinker drop comprises, in combination, non-releasable means for holding one end of a sling, releasable means for holding the opposite end of said sling, means for releasing said opposite end of said sling, and initiating means for actuating the releasing means, the initiating means being responsive to contact with water when the rig with the novel drop is cast. In use, a sling mounted on the novel drop will accommodate objects in a wide variety of shapes, sizes and weights, and will reliably release them after the fishing rig impacts with water. It is also possible to practice the invention without the sling if the desired weight is an object which may be releasably attachable to the invention's transverse wall, for example, a spark plug.

In a preferred form of the invention, the releasing means includes a pair of hinged plates and a spring urging the plates to a closed position. One plate has a transverse wall with an extending post attached thereto which fits in an aperture in the other plate when the plates are in a closed position. One end of a sling is fixedly attached to the hinge pin and the other end of the sling is mounted on the post between the plates, with the sinker in the sling. With the novel drop attached to a fishing rig, the rig is cast. Upon contacting the water, the hinged plates open aided by the initiating means in the form of a cup on the outer side of the one plate, thereby releasing the other end of the sling and dumping the sinker. If however, the sling is not utilized, a spark plug or some other device which has the capability of being releasably attached to the invention's tranverse wall will similarly be released upon impact with water. The preferred sling is a relatively triangular net wherein on apex is fixedly attached to the novel drop, and the other two apices are joined together and detachably mounted on the post of the drop.

BRIEF DESCRIPTION OF THE DRAWINGS

FIG. 1 is a sectional, elevational view of a preferred embodiment of the novel sinker drop held open to better illustrate its structure.

FIG. 2 is a partially broken-away elevational view of the sinker drop shown in FIG. 1 with a preferred sling attached and ready to be cast.

FIG. 3 is an elevational view of the novel sinker drop shown in FIG. 2 just after one end of the sling has been released and the sinker therein is being dumped.

DESCRIPTION OF THE INVENTION INCLUDING THE PREFERRED EMBODIMENT

Figure 4:
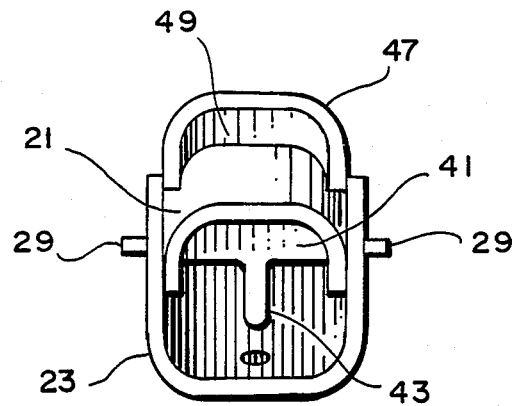
FIG. 4 is a cross section of FIG. 1 taken at line A.

The following description of some of the preferred embodiments of the concepts of this invention is made in reference to the accompanying figures. Where an individual structural element is depicted in more than one figure, it is assigned a common reference numeral for simplification of identification and understanding.

The preferred embodiment of the novel sinker drop shown in FIGS. 1, 2 and 3 comprises a male plate 21 and a female plate 23 that are hinged together near the top ends 25 and 27 respectively with a hinge pin 29 that passes through hinge apertures 31 and 33 respectively. There is a spring 35 around the hinge pin 29 with the ends thereof anchored in each of the plates 21 and 23 through spring apertures 37 and 39 respectively so as to urge the plates 21 and 23 into a closed position, as shown in FIGS. 2 and 3.

The plates 21 and 23 are curved, FIG. 4, and each plate has two hinge apertures with the hinge pin 29 bridging across the space between the two pairs of apertures 31 and 33. In the closed position, the plates 21 and 23 enclose an elongated hollow volume. The hinge 29 has an eye (not shown) in the volume, which eye is used for attachments as describe below.

The male plate 21 has on its inner surface a transverse wall 41 near the bottom end 51 thereof. A post 43 fixed to the top of the transverse wall 41 and extends sidewardly towards the female plate 23. The female plate 23 has a post aperture 45 so located that the post 43 can freely enter and loosely fit in the post aperture 45. A cup 47 is attached to the outer surface of the male plate 21 with its open end 49 facing the bottom end 51 of the male plate 21.

A long link 53 is attached at one end to the eye in the hinge pin 29 the long link 53 hangs down in the hollow volume enclosed by the plates 21 and 23. A short link 55 having a snap is attached to the other end of the long link 53. The sinker drop may be sold as shown in FIG. 1 and used without a sling, or the buyer may provide his own sling. Or, the unit may be sold with a sling, such as the preferred sling 57 shown in FIGS. 2 and 3.

Figure 5:
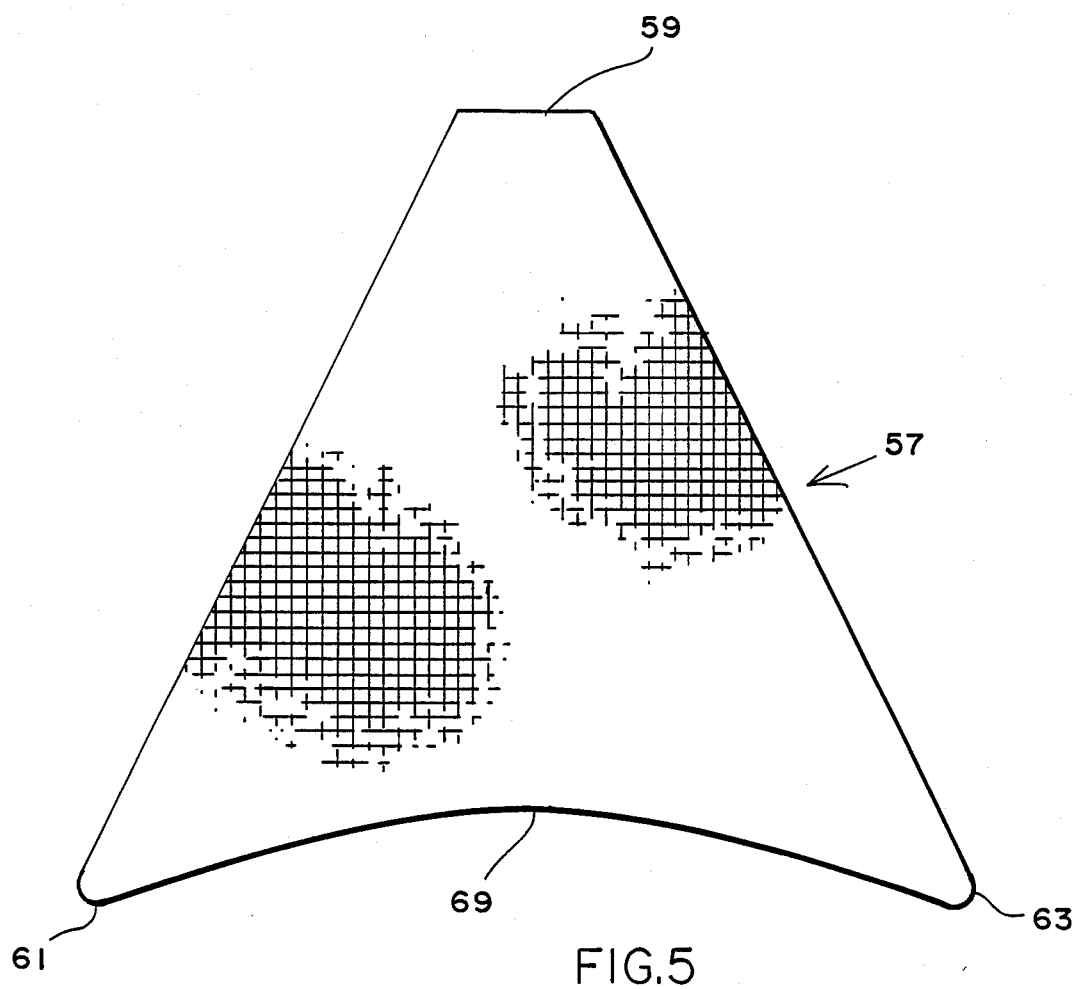
FIG. 5 is a plan view of the invention's sling shown without eyes.

The preferred sling 57 is a relatively triangular net having three apices 59, 61, and 63 with a concave edge 69, FIG. 5 (shown without eyes). One apex 59 designated the "fixed end" has a fixed eye 65 attached thereto and is adapted to be snapped into the short link 55 as shown. The other two apices 61 and 63 are joined together, designated the "detachable end" which has a detachable eye 67 that is adapted in size to fit loosely on the post 43 between the plates 21 and 23 as shown in FIG. 2. The concave edge of the net 69 between the other two apices 61 and 63 at the "detachable end" forms a loop through which an expendable sinker can be inserted and dumped from the sling 57. The concave structure of the net edge 69 prevents smaller weights from being entangled in the sling 57 when the weight is to be dumped.

In one mode of operation, a leader 71 is attached to the hinge pin 29 and a sling 57 is attached at its "fixed end" to the short link 55 using the fixed eye 65. Then, the leader 71 is attached to the fishing rig (not shown). The plates 21 and 23 are manually opened, the detachable eye 67 is placed on the post 43 and the plates 21 and 23 are permitted to close under the urging of the spring 31, with the detachable eye 67 captured on the post 43. Then, an expendable weight 73, shown with phantom lines, is deposited in the sling 57 through the loop 70, thereby completing the rigging of the novel sinker drop as shown in FIG. 2. The weight 73 or sinker may be any object, usually discarded from some other use. For example, the weight 73 may be a rock, or a ball-bearing, or a bolt or a nut, or a washer, etc. Clearly, the weight 73 may be in a wide range of shapes, sizes and weights.

When the fishing rig with the novel sinker drop shown in FIG. 2 is cast, it will be capable of reaching an optimum and greater distance due to the additional weight 73 carried in the sling 57. When the drop hits the water during the cast, the open end 49 of the cup 47 rapidly decelerates the drop causing the plates 21 and 23 to open momentarily, allowing the detachable eye 67 to slip off the post 43. While in the water, the sling 57 unfurls, as shown in FIG. 3, allowing the weight 73 to roll or slide down the sling 57 and out of the sling 57, as shown by the arrows 75, 77 and 79. Because of the sling arrangement, there is little or no tendency for the sling 57 to fold around the weight 73 during or after the cast. Thereby, the fishing rig is reliably unweighted to optimize the rig for fishing.

In another mode of operation, the sling 57 is not used. Rather, an object capable of being releasably attached to the tranverse wall 41, for example, a spark plug (through the spark plug gap) is so attached. As with the sling 57 operation, the spark plug weight is cast and upon impact with water, the spark plug is released, thereby freeing the fishing line of excess weight.

The foregoing figures and descriptions thereof are provided as illustrative of some of the preferred embodiments of the concepts of this invention. While these embodiments represent what is regarded as the best modes for practicing this invention, they are not intended as delineating the scope of the invention which is set forth in the following claims.

What is claimed is:

1. A sinker drop for use in a fishing rig comprising, in combination, a sling made of net-like material, non-releasable for holding one end of said sling, releasable means for holding the opposite end of said sling, means for releasing said opposite end of said sling, and initiating means for actuating said releasing means, said initiating means being responsive to contact with water when said rig is cast.

2. The sinker drop defined in claim 1 wherein said sling includes an eye at each end thereof; said releasing means includes a mating pair of plates, each plate having a top end, a bottom end, said plates being hingedly attached to one another near the top ends thereof, and a spring means for urging said plates into a closed position; and said releasable holding means includes a post attached to the confronting inner surface of one of said plates, said post being adapted in size to fit an eye in said sling and extends sidewardly towards the other of said plates, said other plate have an aperture therein adapted to fit around said post when said plates are in said closed position.

3. The sinker drop definded in claim 2 wherein said plates are hingedly attached to one another with hinging means including a hinge pin, and said non-releasable holding means includes a link attached at one end to said hinge pin and attached at the other end thereof to the other eye in said sling.

4. The sinker drop defined in claim 3 wherein said attaching means includes an eye in said hinge pin.

5. The sinder drop defined in claim 3 wherein said initiating means includes a cup attached to the outer surface of said one plate, said cup having an open end facing the bottom end of said one plate.

6. The sinker drop defined in claim 1 wherein said sling is a relatively triangular net, one apex of said sling is connected to said non-releasable holding means, and the other two apices are joined together and are connectable to said releasable holding means; and said net having an edge which is concave.

7. sinker drop for use in a fishing rig comprising a mating pair of hinge plates, each plate having a top end and bottom end, said hinge plates being rotatably attached to one another near the top end thereof with a hinge pin; spring means urging said plates towards one another into a closed position enclosing an elongated hollow volume; a cup attached to the outer surface of one of said plates, said cup having an open end facing the bottom end of said one plate; a post attached to a transverse wall which is attached to the inner surface of said one plate and extending sidewardly towards the other of said plates; the other of said plates having an aperture therein adapted to fit around said post when said plates are in said closed position.

8. The sinker drop defined in claim 7 wherein said hinge pin has a centrally located hinge-pin aperture therein within said hollow volume.

9. The sinker drop defined in claim 8 including sling having a fixed end and a detachable end, and a link attached at one end thereof to said hinge pin and attached at the other end thereof to said fixed end of said sling, the detachable end of said sling having means for mounting on said post.

10. The sinker drop defined in claim 9 wherein said sling is a triangular net having three apices, one of said apices having a fixed-end eye therein adapted for attaching to said link, and the other two apices being joined together to form an open loop of the net therebetween and having a detachable-end eye therein adapted to be mounted on said post.

11. The sinker drop definded in claim 10 wherein said link is of such a length that said fixed end of said sling is substantially below said detachable end of said sling when said detachable end is mounted on said post.

* * * * *